US009561877B2

(12) United States Patent
Woods et al.

(10) Patent No.: US 9,561,877 B2
(45) **Date of Patent: *Feb. 7, 2017**

(54) AUTOMATED LABELING APPARATUS USING LABELS HAVING A FLUID ACTIVATABLE ADHESIVE

(71) Applicant: NuLabel Technologies, Inc., East Providence, RI (US)

(72) Inventors: Michael C. Woods, Rumford, RI (US); Benjamin David Lux, Providence, RI (US); Randy Peckham, North Scituate, RI (US)

(73) Assignee: NuLabel Technologies, Inc., East Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,224

(22) Filed: Dec. 17, 2013

(65) Prior Publication Data

US 2014/0150976 A1 Jun. 5, 2014

Related U.S. Application Data

(63) Continuation of application No. 13/742,131, filed on Jan. 15, 2013, now Pat. No. 8,616,259.

(Continued)

(51) Int. Cl.

*B29C 65/00* (2006.01)
*B65C 9/22* (2006.01)

(Continued)

(52) U.S. Cl.

CPC ............... *B65C 9/2213* (2013.01); *B65C 9/14* (2013.01); *B65C 9/2221* (2013.01); *B65C 9/36* (2013.01);

(Continued)

(58) Field of Classification Search

CPC ............ B65C 9/14; B65C 9/40; B65C 9/2213; B65C 9/2221; B65C 9/2217; B65C 9/22; B65C 9/2204; Y10T 156/1798

See application file for complete search history.

(56) References Cited

U.S. PATENT DOCUMENTS 3,354,016 A 11/1967 Carter
4,181,555 A 1/1980 Hoffmann (Continued)

FOREIGN PATENT DOCUMENTS

| | | |
|---|---|---|
| DE | 3038308 | 5/1982 |
| FR | 2491872 | 4/1982 |
| WO | WO2009/024357 | 2/2009 |

OTHER PUBLICATIONS

Machine translation for WO 2009/024357 date unknown.*

(Continued)

*Primary Examiner* — John Goff

(74) *Attorney, Agent, or Firm* — Wolf, Greenfield & Sacks, P.C.

(57) ABSTRACT

An apparatus and method is described herein for automatically labeling using labels having a fluid activatable adhesive along the back surface of such label. The apparatus has multiple pallets each being positionable with the lowermost label of a stack of one or more labels to releasably secure by suction the label against the pallet, and multiple pads each being positionable with respect to pallets to receive labels from the pallets and then releasably retain such labels until application onto containers. Fluid for activating adhesive is applied by an applicator onto labels retained upon the pad to change the fluid activatable adhesive along the label's back surface from a non-tacky state to a tacky state just prior to application of the label onto container.

16 Claims, 16 Drawing Sheets

Related U.S. Application Data

(60) Provisional application No. 61/731,960, filed on Nov. 30, 2012.

(51) Int. Cl.
*B65C 9/14* (2006.01)
*B65C 9/36* (2006.01)
*B65C 9/00* (2006.01)

(52) U.S. Cl.
CPC .. *B65C 2009/0028* (2013.01); *Y10T 156/1771* (2015.01); *Y10T 156/1778* (2015.01); *Y10T 156/1798* (2015.01)

(56) References Cited

U.S. PATENT DOCUMENTS

| | | | | |
|---|---|---|---|---|
| 4,201,617 | A * | 5/1980 | Orsinger | B07C 3/00 118/712 |
| 4,244,763 | A | 1/1981 | Varon et al. | |
| 4,380,319 | A | 4/1983 | Shigut | |
| 4,844,760 | A * | 7/1989 | Dickey | B65C 3/16 118/684 |
| 5,232,540 | A | 8/1993 | Southwell et al. | |
| 5,486,253 | A | 1/1996 | Otruba | |
| 5,865,918 | A | 2/1999 | Franklin et al. | |
| 7,229,517 | B2 | 6/2007 | Bellafore et al. | |
| 8,142,604 | B2 | 3/2012 | Rehkugler et al. | |
| 8,616,259 | B1 * | 12/2013 | Woods et al. | 156/578 |
| 2003/0192639 | A1 | 10/2003 | Mitchell et al. | |
| 2004/0099379 | A1 | 5/2004 | Erich | |
| 2004/0134913 | A1 | 7/2004 | Kronseder et al. | |
| 2007/0119542 | A1 | 5/2007 | Williams | |
| 2007/0163697 | A1 | 7/2007 | Kursawe | |
| 2009/0288759 | A1 | 11/2009 | Topfer et al. | |

OTHER PUBLICATIONS

International Search Report & Written Opinion, PCT/US2013/069065, mailed Feb. 19, 2014, 15 pages.

Notification Concerning Transmittal of International Preliminary Report on Patentability, PCT/US2013/069065, mailed Jun. 11, 2015, 9 pages.

* cited by examiner

AUTOMATED LABELING APPARATUS USING LABELS HAVING A FLUID ACTIVATABLE ADHESIVE

CROSS-REFERENCE TO RELATED APPLICATIONS

This application is a continuation application and claims priority under 35 U.S.C. §120 to U.S. patent application Ser. No. 13/742,131 filed on Jan. 15, 2013 (U.S. Pat. No. 8,616,259 to issue on Dec. 31, 2013), which claims benefit of priority under U.S.C. §119(e) to U.S. Application Ser. No. 61/731,960, filed on Nov. 30, 2012, the contents of which are hereby incorporated by reference in its entirety.

FIELD

An automated labeling apparatus and methods are described herein. More particularly an automated labeling apparatus and method for applying labels having fluid activatable adhesive onto containers, such as bottles, cans, or jars is described herein.

BACKGROUND

For over 50 years, automated machines have been used to apply labels onto containers, such as bottles, cans or jars. Typically these machines utilize cold glue or hot melt adhesives which are applied by a roller onto a pad prior to pickup and then transfer of a label onto another pad or drum which applies it to a container. Conventional automated labeling machines include those manufactured by Krones AG in Germany or Krones, Inc. in Franklin Wis. (Krones AG and Krones, Inc., being referred to herein as "Krones"). Other adhesives that have been used on such labeling machines include UV curable adhesives, which operate and are less tacky than cold glue or hot melt adhesives, until UV light is applied to the adhesive label. Although these adhesives are useful for their intended purpose, it has been found that applying tacky liquid adhesives prior to pickup of labels and throughout the entire label application process is undesirable as the liquid adhesives fall onto various parts of the machine creating a mess and can require excessive maintenance including machine downtimes to cleanup the machine.

In addition to cold and hot glue applied labeling methods, preprinted pressure sensitive adhesive (PSA) labels are also used. These labels utilize a release liner to protect the preprinted label face from interacting with the tacky PSA. The use of traditional PSA labels results in several million pounds of waste per year in the bottling industry. PSAs also lack removability properties desirable in downstream recycling and bottle reusing facilities.

U.S. Pat. Nos. 6,306,242; 6,517,664; and 6,663,749 to Dronzek describe an additional example of a labeling system for applying labels to plastic and glass bottles. The labeling system includes applying a layer of a hydrophilic solid material to a polymeric label to form a hydrophilic layer on said polymeric label; applying water, water containing a cross-linking agent or a water based adhesive over said hydrophilic layer to form a fastenable polymeric label; fastening said fastenable polymeric label to a glass, plastic or metal container or surface; and curing said polymeric label on said glass, plastic or metal surface or container. In this system the fluid contains functional chemical components in the form of solids suspended, dispersed, or dissolved in a liquid carrier.

SUMMARY

An improved automated labeling apparatus and method for applying labels having a fluid activatable adhesive to containers (e.g., containers such as bottles, cans, or jars) in which the labels are non-tacky until just before application to containers, thereby avoiding the use of tacky adhesives prior to pickup of labels and throughout the entire label application process and providing a cleaner running operation is described herein.

In some aspects, an apparatus having a rotating transfer member including pallets carried thereon, and a dispensing magazine for retaining individual labels in a stack, with the lowermost label in the stack being located in a downstream path of travel of the pallets. Each of the pallets being rotated into close proximity with the lower surface of the lowermost label in the magazine and having openings through which suction is communicated to the lowermost label in the stack for removing the lowermost label from the stack and releasably securing the lowermost label to each of the pallets. A second rotating transfer member having pads carried thereon each with label retaining members for receiving and releasably securing the individual labels from the pallets, and directing the labels through an adhesive activation station with one or more fluid dispensing mechanisms (e.g., sprayers) to apply a fluid for activating adhesive on the back surface of label to change said back surface from a non-tacky state to a tacky state. The adhesive activation station is positioned adjacent to a label application station such that the individual labels upon the pads are directed sequentially into engagement with the periphery of discrete containers with release from the retaining members as the discrete containers are directed through the label application station.

In some additional aspects, a method for applying labels having a fluid activatable adhesive to containers is described herein. The method includes maintaining a dispensing magazine for retaining a plurality of individual labels in a stack, positioning a first transfer member with the lowermost label in the stack, applying suction to releasably secure the label against the first transfer member to engage the lowermost label in the stack, positioning a second transfer member for receiving the individual labels from the first transfer member, applying a fluid for activating adhesive on a back surface of the label received upon the second transfer member to change the back surface from a non-tacky state to a tacky state, and adhering the label to the outer surface of a container after the fluid is applied.

BRIEF DESCRIPTION OF THE DRAWINGS

The foregoing and other objects, features and advantages of the invention will become more apparent from a reading of the following description in connection with the accompanying drawings in which.

DETAILED DESCRIPTION

Figure 1:
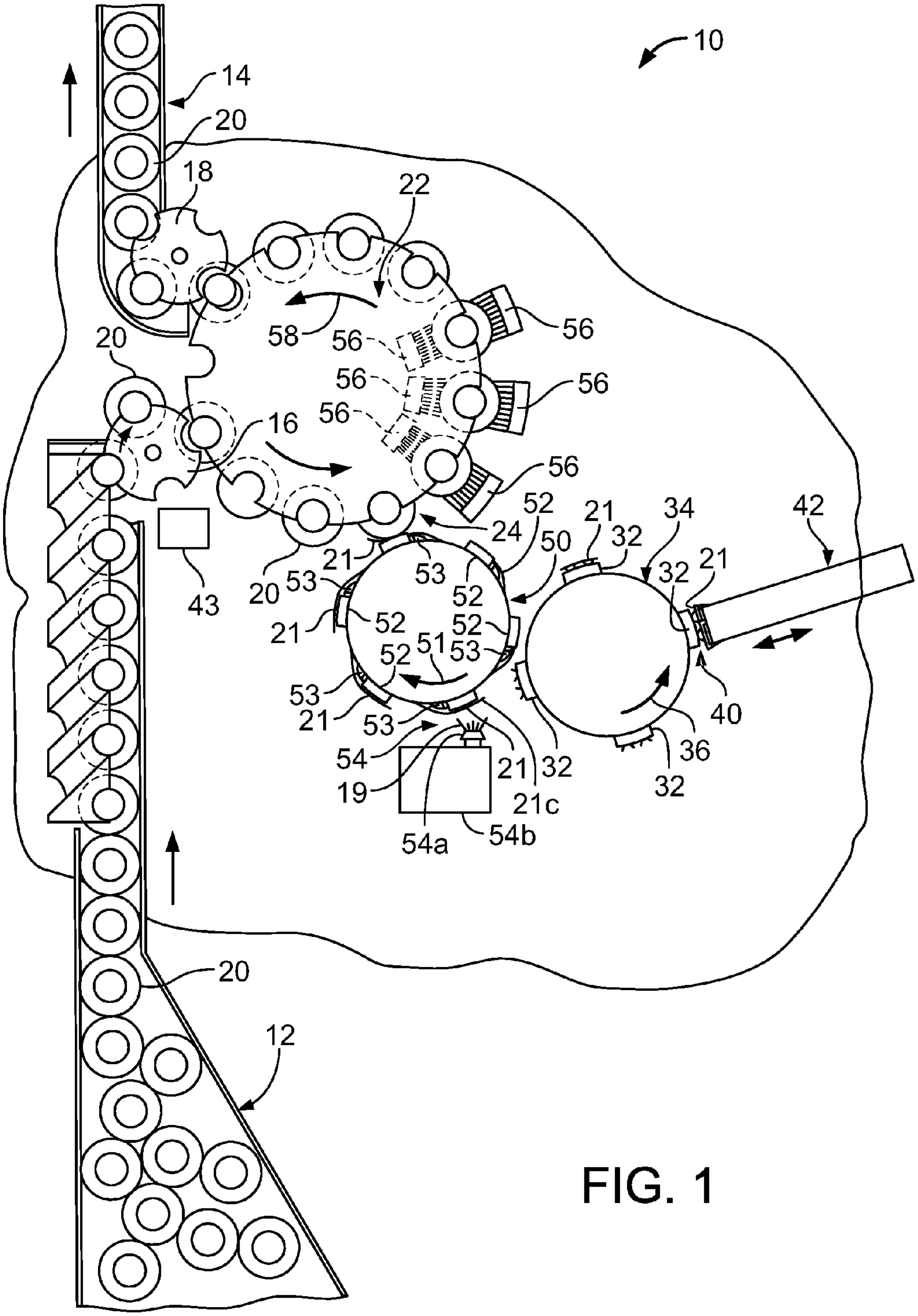
FIG. 1 is a schematic, plan view illustrating a labeling apparatus.
Figure 2A:
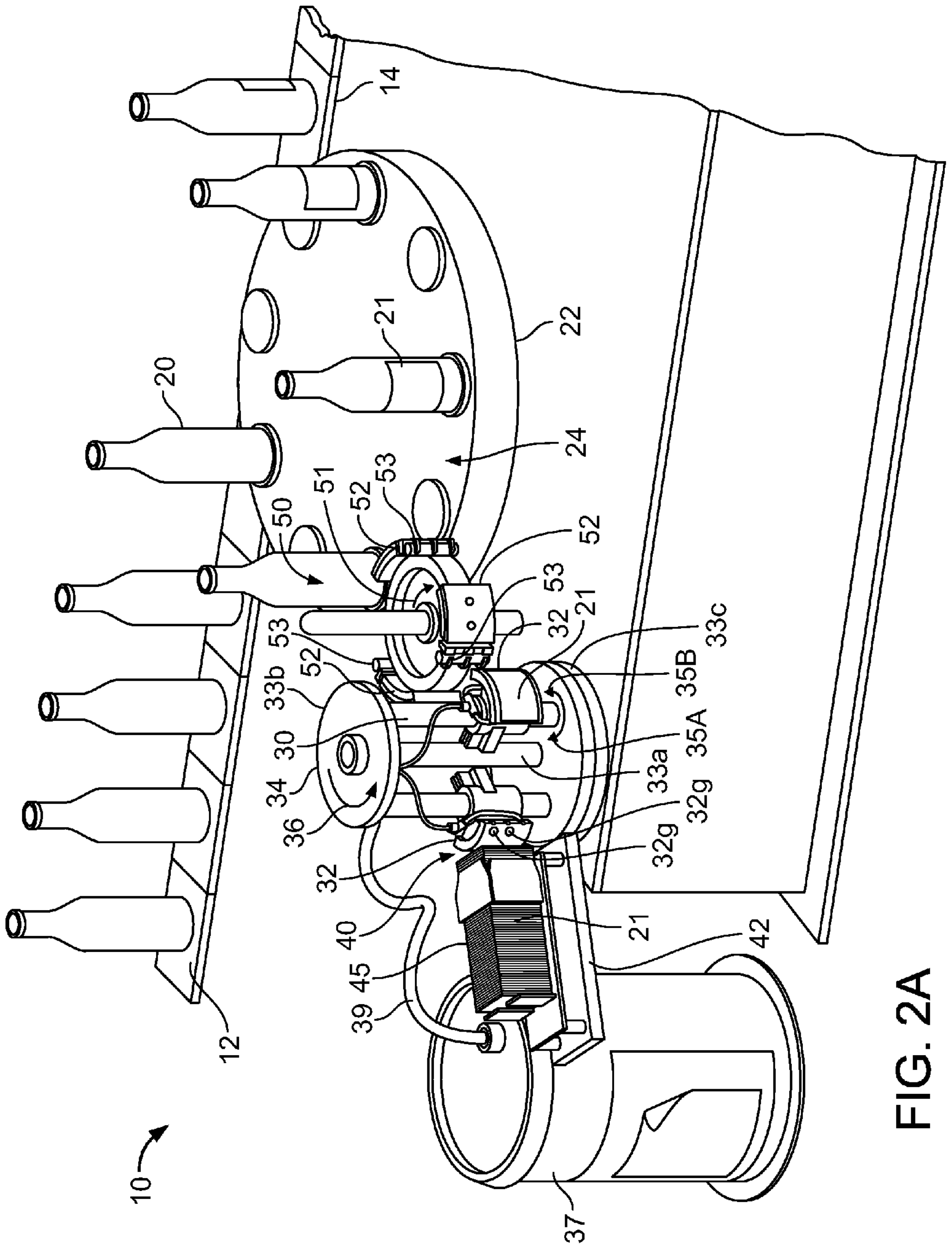
FIG. 2A is the perspective view of the apparatus of FIG. 1.
Figure 2B:
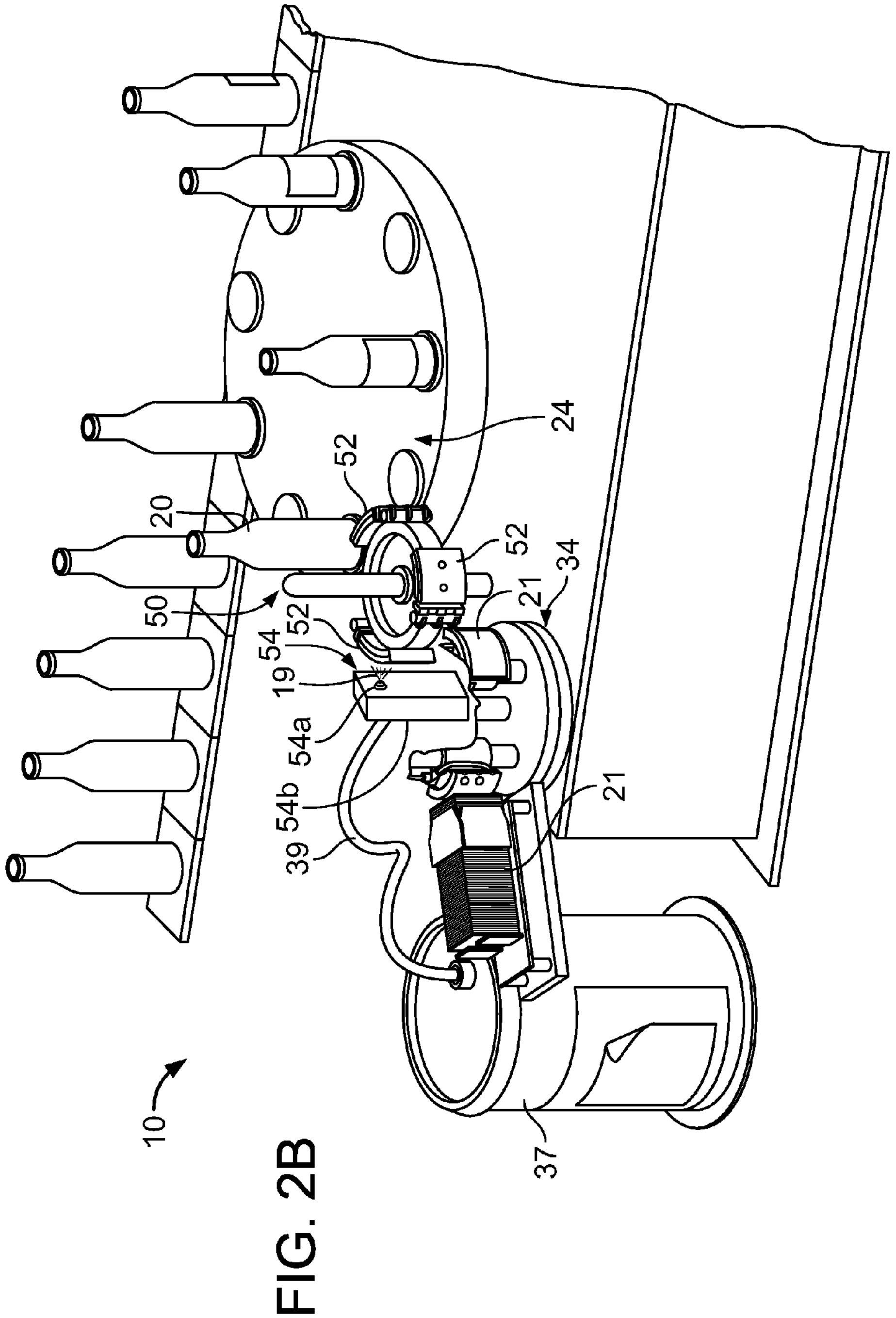
FIG. 2B is same perspective view as FIG. 2A with the first rotating transfer member partial broken to show the adhesive activation station along the second rotating transfer station.

Referring to FIGS. 1, 2A and 2B, an apparatus 10 for automatically applying labels to containers is shown Apparatus 10 employs an inlet conveyor section 12, an outlet conveyor section 14 and rotating bottle-transfer members 16 and 18 for transferring bottles 20 from the inlet conveyor section to a rotating platform or turret 22, and for removing bottles 20 from the rotating turret 22 to the exit conveyor section 14, respectively, after the bottles have been directed through label application station 24. However, in some embodiments an in-line system that does not require the use of a rotating turret to handle the bottles, or other containers, during the label application operation can be used. Bottle-transfer members 16 and 18 are not shown in FIGS. 2A and 2B for purposes of illustration.

It should be understood that the construction of the inlet conveyor section 12, outlet conveyor section 14, rotating bottle-transfer members 16 and 18 and rotating turret 22 would be apparent to one of ordinary skill in the art. For example, Krones manufactures a line of rotary labeling equipment including an inlet conveyor section 12, an outlet conveyor section 14, rotating bottle-transfer members 16 and 18 and a rotating turret 22 of the type that can be employed in the present systems and methods. Therefore, a detailed discussion of these features is not required herein.

The system 10 also includes two transfer members 34 and 51 that are used to transfer a label from a magazine 42 that retains a stack 45 of labels to the bottles 20. More particularly, during use, the first rotating transfer member 34 uses a suction based pallet to remove a non-activated label from the magazine 42 and transfer the label to a pallet on the second rotating member 51. Once the label is secured on the second rotating member, the vacuum is released. Subsequently, a fluid is applied by an adhesive activation station 54 and the activated label is subsequently applied to the bottle. More particularly, multiple pallets 32 are mounted on the first rotating transfer member 34 (rotated in the direction of arrow 36) through support shafts 33*a* mounted for oscillatory motion relative to the support shaft, as represented by the arrow heads 35 and 35A. Transfer member 34 rotates along a shaft 33 a pair mounting plates 33*a* and 33 between which support shafts 33*a* extend between. This oscillatory motion is provided by a cam drive arrangement. Exemplary cam drive arrangements for rotating a transfer member are known to those skilled in the art.

In the one embodiment, pallets 32 are oscillated in the counterclockwise direction of arrow 35A, as viewed in FIG. 2A. Pallets 32 are directed sequentially by the rotating member 34 to a transfer station 40. The transfer station 40 includes a magazine 42 retaining a stack 45 of cut labels 21 therein. A label is transferred from the transfer station 40 by application of a vacuum to the pallet 32. The label continues to be retained on the pallet 32 during rotation of the transfer member 34 by continued application of the vacuum.

Figure 3:
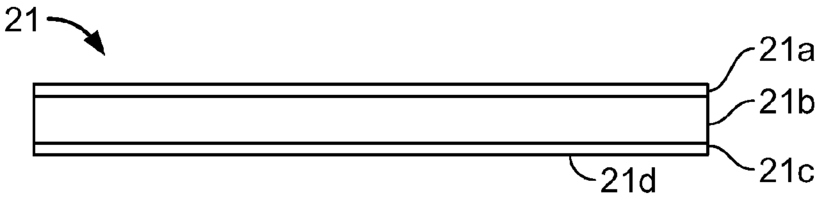
FIG. 3 is cross-sectional view of one of the labels of FIG. 1.

As shown in FIG. 3, each label (or media) 21 has a printable layer 21*a* formed on the front side of a stock, media, or facesheet 21*b*, and a back side 21*c* with a solvent (fluid) sensitive adhesive agent layer 21*d* (such as a polymer type adhesive) which possesses no tack in its dry or non-activated state. Layer 21*d* enables label 21 to become tacky along its back side once layer 21*d* becomes tacky upon application of activating fluid 19 when supplied at adhesive activation station 54, as described later below. This enables the label once its adhesive is activated to adhere along its back surface to a variety of article surfaces, such as paper, cardboard, metal, as well as glass and plastics. In the example of FIG. 1, the containers 20 in the case of bottles may be glass or plastic. Exemplary liner-free labels 21 and activating fluid 19 are described in U.S. Pat. No. 8,334,336 titled "Fluid Activatable Adhesives and Fluids for Activating Same for Use with Liner-Free Labels" and U.S. Pat. No. 8,334,335 titled "Fluid Activatable Adhesives and Fluids for Activating Same for Use with Liner-Free Labels", the contents of each of which are hereby incorporated by reference in their entirety. The printable layer 21*a* may be a preprinted layer of ink(s) providing the desired label for container 20 as typical of labels applied to containers. Typically all labels in the stack 45 are identical for a given set of container 20 being processed by the apparatus 10.

Referring to FIGS. 4A-4D, a single pallet 32 is shown removed from its support shaft 33*a*. Each pallet 32 has a grooved front curved surface 32*a* with openings (e.g., channels, holes, etc.) 32*b* extending to a back surface 32*c*, as illustrated by dashed lines in FIG. 4B. The pallet 32 is mounted to its associated support shaft 33 by a clamp 32*d*.

Received in each of holes 32*b* is a suction cup 32*g* having an opening 32*h* in communication with its associated hole 32*b*. There are four holes 32*b* which are bored through pallet 32 in right and left pairs with respect to FIG. 4A, where only the right pair of holes 32*b* is visible in FIG. 4B. The suction cup 32*g* is formed of Vinyl, Polyurethane, Nitrile, Silicone, or other soft rubber. An upper surface of the suction cup 32*g* is co-planar with the curved surface 32*a* of the pallet 32. The size, number, and location of the suction cups 32*g* can vary based on the size and weight of the labels to be applied by the labeling system 10. In one particular embodiment, the suction cups 32*g* have a diameter of between 2 mm and 20 mm. The depth of the suction cup 32*g* can be between 0.5 mm and 5 mm. Thus, in general, the suction cup has a semi-spherical shape with a curved upper surface. The suction cup 32*g* has a solid upper surface that interrupts the grooves in the front curved surface 32*a* such that the grooves do not extend across the suction cup 32*g*. In some examples, the suction cups 32 are raised above the surface of the grooves. In some embodiments in which the suction cups 32 are raised above the surface of the pallet the label is adhered to the face of the suction cups and suspended above the surface of the pallet such that the label does not physically contact with the grooved surface.

A suction supply mechanism is provided along each pallet 32. In the preferred embodiment, along the backside of each pallet 32 are two vacuum generators 32*f* (see FIG. 4D). Each of the vacuum generators 32*f* has a port 32*i* for output of suction/vacuum, via a flexible tube 32*k*, to one of two manifold member 32*e*, and an port 321 for input of air pressure delivered via tubing 32*m* which splits to provide air pressure to port 321 of each vacuum generator 32*f*.

Figure 4A:
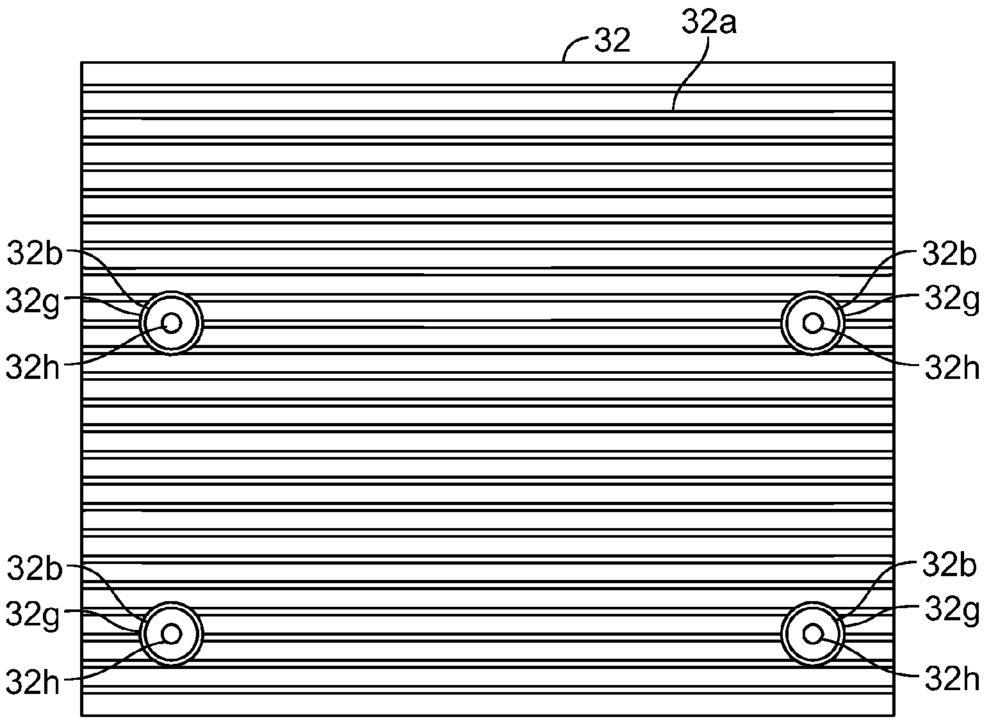
FIG. 4A is front view of one of the transfer pallets of FIG. 1.
Figure 4B:
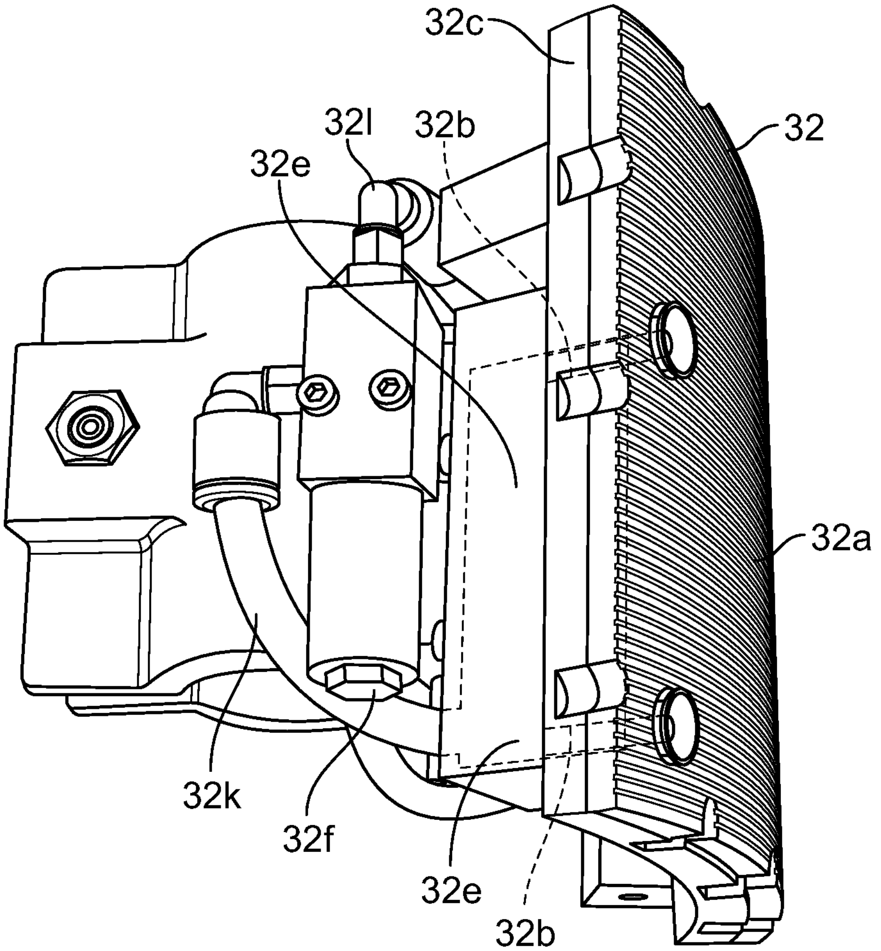
FIG. 4B is a perspective view of one of the pallets mounted to the first rotating transfer member of FIG. 1 taken from the right end showing the suction supply mechanism for retaining a label when received upon the pallet.
Figure 4C:
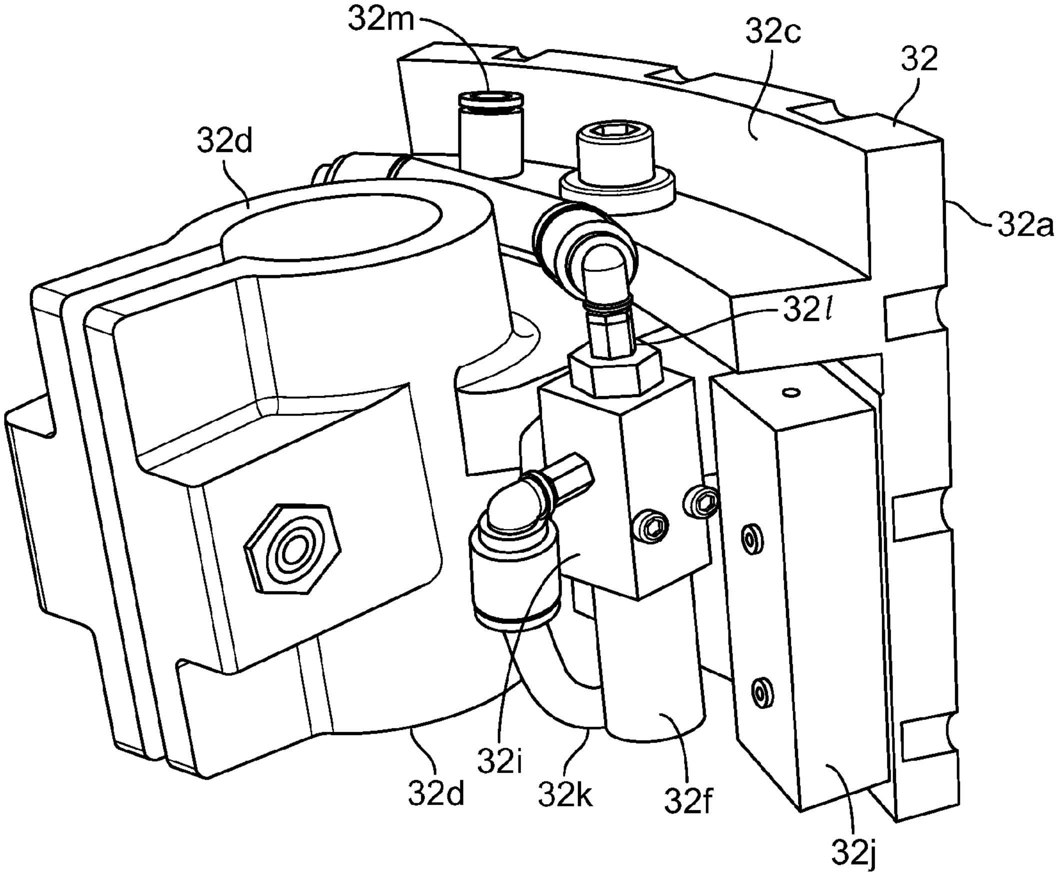
FIG. 4C is a perspective view of one of the pallets mounted to the first rotating transfer member of FIG. 1 taken from the right end along the back thereof showing the suction supply mechanism for retaining a label when received upon the pallet.
Figure 4D:
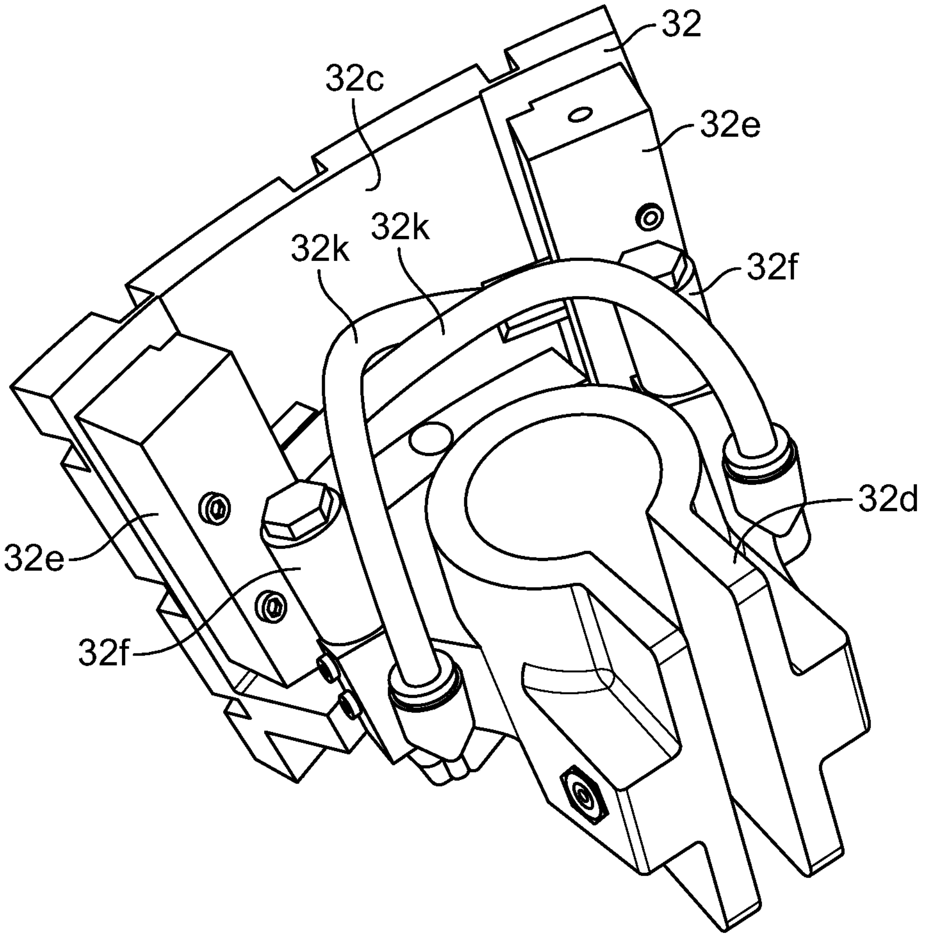
FIG. 4D is a perspective view of one of the pallets mounted to the first rotating transfer member of FIG. 1 taken top end along the back thereof showing the suction supply mechanism for retaining a label when received upon the pallet.

Each of the two manifold members 32*e* are mounted to back surface along the right and left sides thereof as best shown in FIG. 4D and are aligned with right and left pairs of holes 32, respectively. The manifold members 32*e* each has a chamber 32*j*, as shown in dashed lines in FIG. 4B, in communication with such different one of pairs of holes 32*b*. Thus, suction may be provided via holes 32*b* to openings 32*h* of suction cups 32*g* from generators 32*f*, via tubes 32*d* and manifolds 32*e*, where each generator 32*f* supplies suction to a different pair of holes 32*b*. Thus, the vacuum applied to the suction cups 32*g* on each of the pallets 32 can be independently controlled. As such, a control system (e.g., a software based control system) can apply the vacuum to a particular pallet 32 when the pallet approaches the magazine 42 holding the labels and release the vacuum when the label has been successfully retained by the pallet on the second rotating member 51. Although four holes 32*b* and suction cups 32*g*, additional holes with suction cups may be provided through which suction may be communicated as described above.

In one particular example, vacuum generators 32*f* can be a venturi type vacuum generator. However, other mechanisms for supplying suction which are sufficient to retain a label upon pallet 32 may be used.

This magazine 42 is mounted for linear reciprocating motion toward and away from the exposed surface of the transfer pallets 32, respectively, as is conventional in Krones labeling machines. The linear reciprocating movement of the magazine 42 is controlled by a photo detection system 43 positioned to detect the presence of a container at a specified location, preferably at the downstream end of helical feed roll 12, of the inlet conveyor 12. If a container is detected at the specified location on the inlet conveyor 12, the magazine 42 will be moved into, or maintained in a forward position for permitting a desired transfer pallet 32 to engage and remove the lowermost label from the stack of cut labels 21 retained in the magazine. The desired pallet 32 is the one that receives a label that ultimately will be aligned with the detected container 20 when that container is in label applicator section 24 of the rotating turret 22, to thereby transfer, or apply, the label to the container, as will be described in detail hereinafter. If a container 20 is not detected at the specified location by the photo detection system 43, then the magazine 42 will be retracted to preclude a predetermined transfer pad 32 from engaging and receiving the lowermost label in the magazine 21, which label ultimately would have been directed to an empty container position at the label applicator section 24 on the turret 22 resulting from a container not being in the specified location being monitored by the photo detection system.

Figure 5:
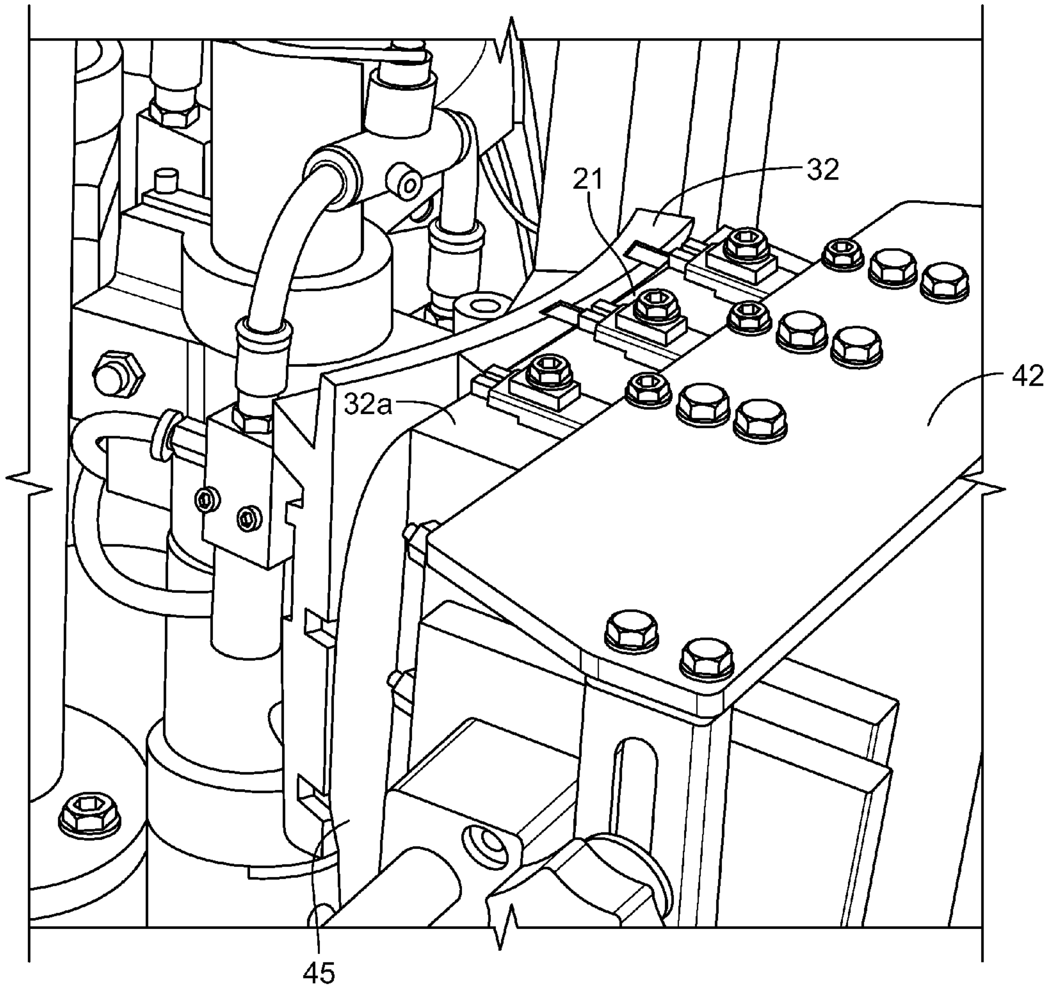
FIG. 5 is a perspective view of one of the pallets of FIG. 1 at the transfer station when capturing the lowest most label from a stack of labels.
Figure 6:
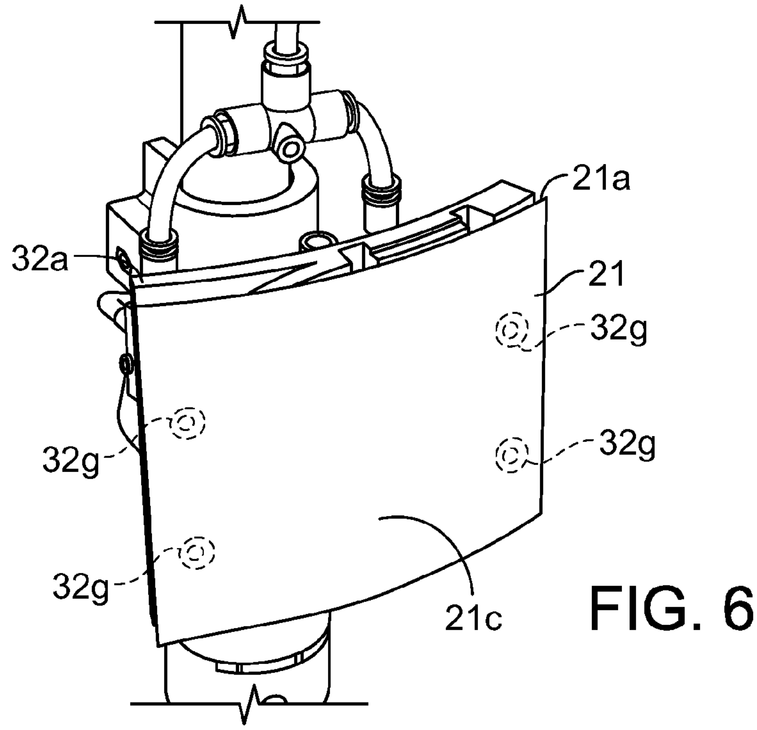
FIG. 6 is a perspective view of one of the pallets of FIG. 1 with a label retained by suction upon the pallet.

Still referring to FIGS. 1, 2A, and 2B, when a transfer pallet 32 is in a position aligned for engaging the lowermost label 21 carried in the magazine 42, that pallet 32 is oscillated in the clockwise direction of arrow 35, as viewed in FIG. 1, for engaging the lowermost label 21 in the magazine 42, as shown in FIG. 5, and then to remove that label 21 from the stack by suction from the pallet via holes 32*b* and their associated suction cups 32*g*, so that the front surface 21*a* of label 21 faces front surface 32*a* of pallet 32 and is retained upon pallet 32 as illustrated in FIG. 6. Suction cups 32*g* assist is directing suction to portions, areas, or locations along the front surface 21*a* which contact the suction cups as denoted by dashed lines in FIG. 6. Other areas or label 42 not engaged by suction extend along the curved front surface 32*a* of pallet 32.

The mechanical systems employing the oscillatory pallet 32 and the reciprocal magazine 42 may be as employed in commercially available cut and stack label applying systems manufactured, for example, by Krones.

Figure 7:
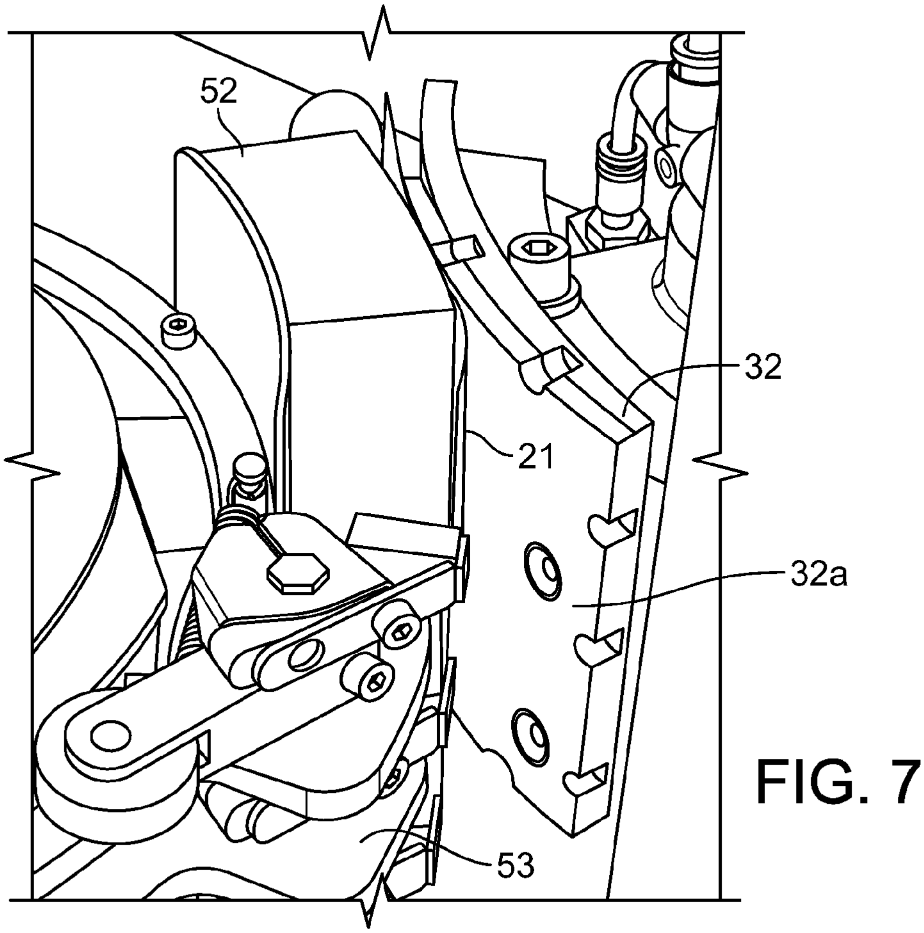
FIG. 7 is an enlarged partial perspective view of FIG. 1A showing one of the pads of the second rotating transfer member with its label retaining members when capturing a label onto the pad with release of the label engaged upon a pallet of a first rotating transfer member as the pad and pallet are rotated in opposite directions to each other along their respective rotating transfer members.
Figure 8:
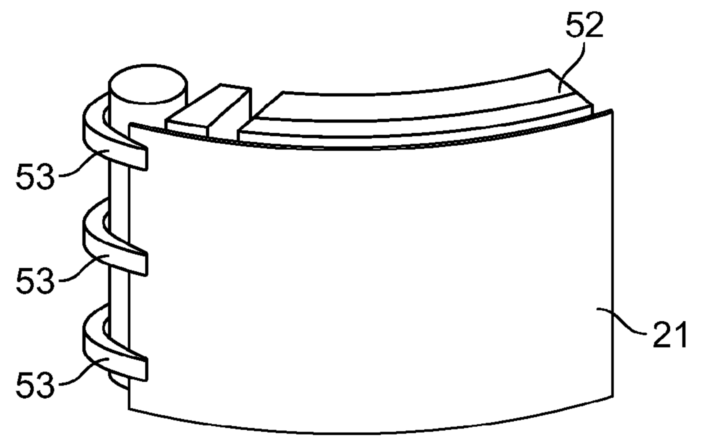
FIG. 8 is a perspective view of one of the pads and its associated label retaining members of the second rotating transfer member at the adhesive application station after capture of a label onto the pad by such label retaining members and before the label application station of FIG. 1.

As shown in FIG. 1, pallets 32 with the labels 21 thereon, are then rotated by the support member 34 to a second rotating transfer member 50 (rotated in the direction of arrow 51) having a plurality of rotated pads 52 each having a cam operated label retaining (or gripping) members or fingers 53 disposed about the periphery thereof for engaging labels 21 carried by the transfer pallets 32 and transferring the labels to the second rotating transfer member 50, as shown in FIG. 7. Each of the retaining members 53 grip to receive upon its associated pads 52 the labels 21 carried on the pallets 32, as shown in FIG. 8, and the later at label application station 24 such retaining members 50 are positioned to release labels. During transfer of the labels to the second rotating transfer member 50, the pallets 32 are oscillated in the counterclockwise direction of arrow 35A, as viewed in FIG. 2A.

Although preferably suction is continuously communicated via opening 32*b* of pallets 32 when the labels 21 are captured by pad 52 by gripping of retaining members 53, optionally suction may be reduced or disabled at such time, or during the period of pallet 32 rotation between the time of transfer onto pads 52 and transfer station 40 to pickup the next label.

While in the example described above in relation to FIG. 7, the label is secured to the second rotating transfer member 50 by label retaining (or gripping) members or fingers 53 disposed about the periphery thereof for engaging labels 21, other methods can be used to secure the labels to the second rotating transfer member. For example, the pads 52 can include a suction based pallet. In such arrangements, the label is transferred by application of a vacuum to the pad 52. The label continues to be retained on the pad 52 during rotation of the second rotating transfer member 50 by continued application of the vacuum. More particularly, the pad can have a front curved surface with holes (or openings) extending to a back surface. Received in each of holes is a suction cup having an opening in communication with its associated hole. The suction cup can be formed of Vinyl, Polyurethane, Nitrile, Silicone, or other soft rubber. An upper surface of the suction cup is co-planar with the curved surface of the pad 52 or extends above the surface of the pad. The size, number, and location of the suction cups can vary based on the size and weight of the labels to be applied by the labeling system 10.

Referring again to FIGS. 1, 2A and 2B, the second rotary transfer member 50, with labels 21 thereon, is directed through an adhesive activation station 54 to change the a solvent sensitive adhesive agent layer 21*d* to a tacky state to permit the label to be securely and effectively adhered to the outer surface of a container 20 along its back surface 21*c*; preferably a curved outer surface of a bottle, where presented thereto at label application station 24.

As shown in FIG. 1 and FIG. 2B, adhesive activation station 54 has one or more fluid dispensing mechanisms (e.g., such as a sprayer 54*a*) for application of pressurized adhesive activation fluid 19 onto labels 21. The activation fluid can be a combination of one or more solvents, such as water and/or low boiling point alcohols. In some examples, the activation fluid does not contain any suspended or dissolved solids in the liquid (e.g., the fluid is a blend of one or more neat drying solvents and/or water) and only contains solvents. In some examples, the solvents can have low enough vapor pressures to evaporate in room temperature environmental conditions. By including no suspended solids in the activation fluid and utilizing volatile solvents, any liquid that is released and not applied to the labels (over-spray) will dry clean thereby reducing cleanup and maintenance of the system 10. Each of the one or more sprayers 54*a* may be a nozzle with a valve that is held in a fixture 54*b* (depicted schematically as a block in FIGS. 1 and 2B). Each nozzle receives fluid 19, via a tube 39, from a source of such fluid, as depicted by container 37 in FIGS. 2A and 2B. The nozzle's valve is actuated when needed to apply fluid 19 to wet label 21 as it moves through station 54. Timing of spraying of fluid 19 for different run speeds of apparatus 10 is enabled by a control system. For example, the nozzle of each of the one or more sprayers 54*a* may be an air-assisted nozzle. However, any sprayer mechanism may be used may be used so that adequate fluid 19 is sprayed on layer 21 as moves with respect to the stationary station 54. For example, the fluid dispensing mechanisms can include an array of one or multiple fan or cone nozzles controlled by valves, an array of one or multiple air-assisted fan or cone nozzles controlled by valves, and/or an inkjet-type spray head.

Each of the sprayers 54*a* provides a fan pattern aligned with the height of the label 21 as it is rotated along upon pad 52 and held thereto by retaining members 53. Thus, the activation fluid is provided directly from the sprayers 54*a* onto the label. Preferably multiple sprayers 54*a*, such as two, for spraying fluid are provided to obtain the desire surface coverage of the label with fluid 19 as it moves through station 54. In one particular example, when two nozzles are used, each nozzle produces at or approximately 2 inch fan when incident the label, and together they activate a label which is 4 inches in height to deliver a uniform layer of fluid 19. Sprayers 54 are aligned in a vertical dimension parallel to the height of label 21, where the sprayers are at a distance from the label 21 to direct coverage of the entire back (or at least substantially the entire back such as greater than 90% of the back surface) of the label 21 needed to assure label adhesive at station 24. The flow rate out of the nozzle is variable depending on label speed to produce a desired fluid 19 deposition rate, such as 0.15 g per 24 square inches. In another example, a single sprayer 54*a* provides a spray pattern sufficient with height of the label.

In this manner, the second rotating transfer member 50 directs the labels held upon pads 52 through an adhesive activation station 54 to apply a fluid 19 for activating adhesive along each label's back surface 21*c* to change its layer 21*d* from a non-tacky state to a tacky state just before application of the label to a container at label application station 24. For example, the fluid activatable adhesive is only tacky to permit the label to be adhered to the outer surface of a container at a location closely adjacent the label application station 24.

Still referring to FIG. 1, each of the labels 21 is directed from the station 54 with the adhesive thereon being in a tacky condition to uniformly and effectively adhere the labels 21 to a container, and the label is then immediately rotated into a position for engaging the outer periphery of a bottle 20 carried on the turret 22 in the label application station 24. It should be noted that the spacing of the labels on the second rotating transfer member 50 and the speed of rotation of the transfer assembly are timed with the speed of rotation of the rotating turret 22 such that each label carried on the second rotating transfer member 50 is sequentially directed into engagement with an adjacent bottle carried on the rotating turret. Moreover, the photo detection system 43 prevents a label from being carried to the label application station 24 when a bottle for receiving such label is missing from that station.

Figure 9:
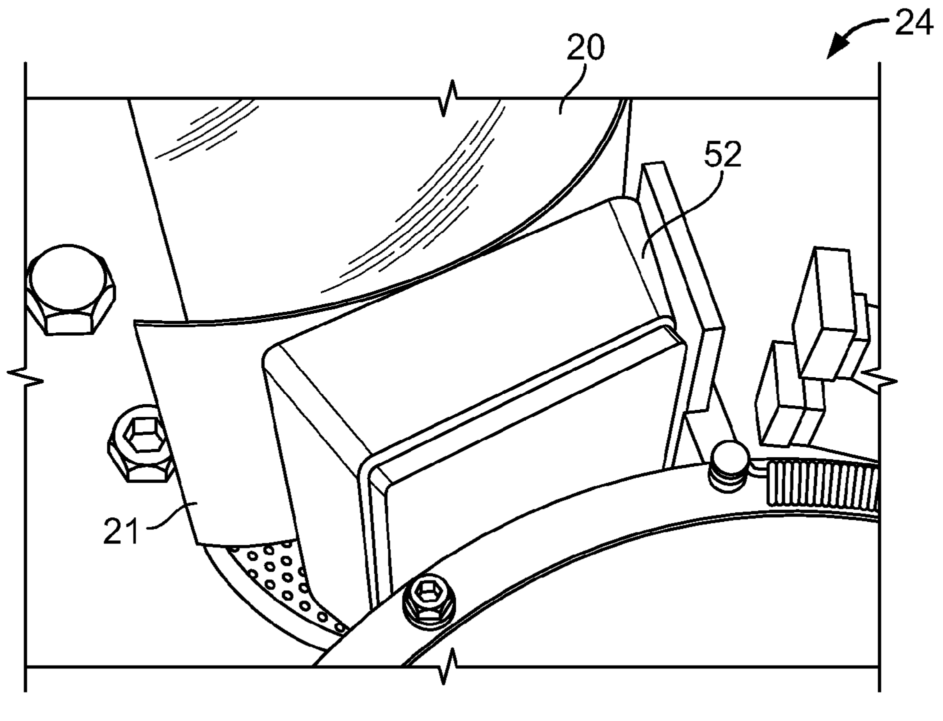
FIG. 9 is a partial perspective view of the label application station of FIG. 1A show the application of a label from one of the pads of the second rotating transfer member onto a container.
Figure 10:
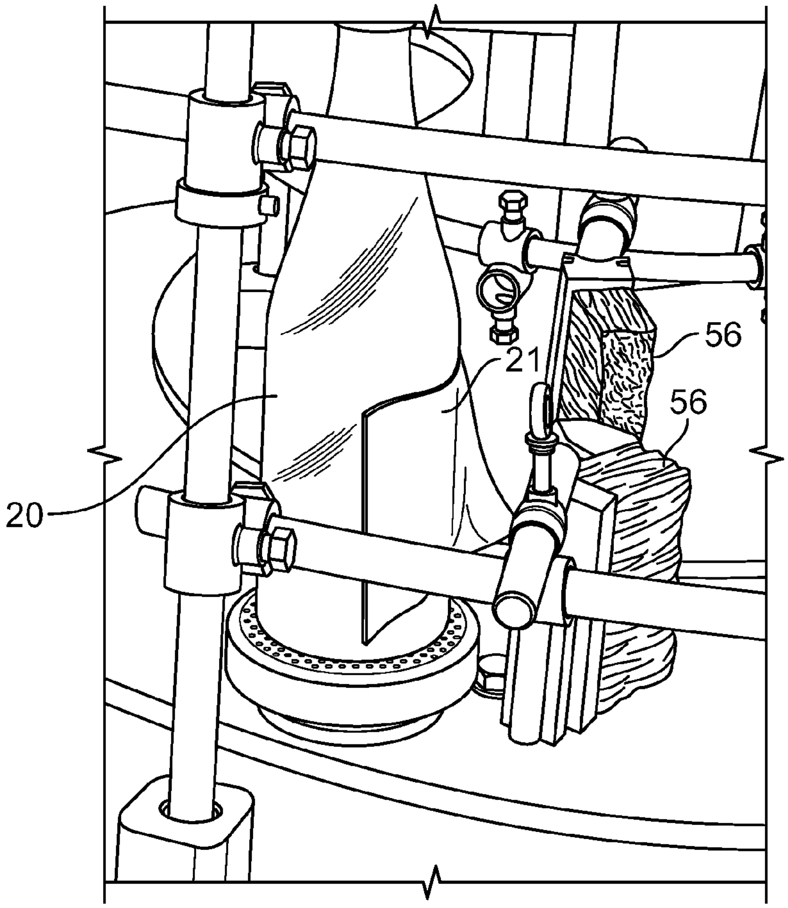
FIG. 10 is a partial perspective view of the container after the label application station of FIG. 1A before the sides of the label are secured to the container by two opposing brushes.

Each of the labels 21 is applied essentially at its midline to the periphery of an adjacent bottle 20, thereby providing outer wings extending in opposed directions from the center line of the label, which is adhered to the bottle. Pad 52 is actuated by a cam mechanism forward at the label activation station 24 with respect to container 20 to receive the label from pad 52. As the pad 52 is often made of deformable material, such as rubber foam, the pad 52 deforms responsive by the contact of the container with the pad to assist in joining the container outer surface to label by its activated adhesive. This manner of applying a label to a bottle is conventional and is employed in rotary labeling equipment, for example manufactured by Krones. However, the labels can be applied to the outer surface of the bottles in other ways. When the amount of tack on the label 21 after label activation station 54 is less than traditionally used cold glue or hot melt adhesive, the amount of deformation should be increased to assist in joining the container outer surface to label by its activated adhesive as well as increasing the level of wrap around of the label to container 20 as shown for example, in FIG. 9. The amount of deformation can be adjusted by increasing the forward position of pad 32 with respect to container 20 at label activation station 24, After a label 21 initially is adhered to a bottle 20 in the label application station 24, the rotating turret 22 directs each bottle, with the label attached thereto, through a series of opposed inner and outer brushes 56, as shown in FIG. 10. As the bottles are directed through the series of brushes the bottles are also oscillated back and forth about their central axis to thereby create an interaction between the bottles, labels and brushes to effectively adhere the entire label to the periphery of each bottle. This brush arrangement and the system for oscillating the bottles as they move past the brushes are of a conventional design and are well known to those skilled in the art. Such a system is included in labeling equipment employing cold glue, for example labeling equipment manufactured by Krones.

The labels 21 after have been effectively adhered to the bottles 20, the bottles are carried by the rotating turret 22 in the direction of arrow 58 to the bottle-transfer member 18, at which point the bottles are transferred to the outlet conveyor section 14 for subsequent packaging.

Figure 11:
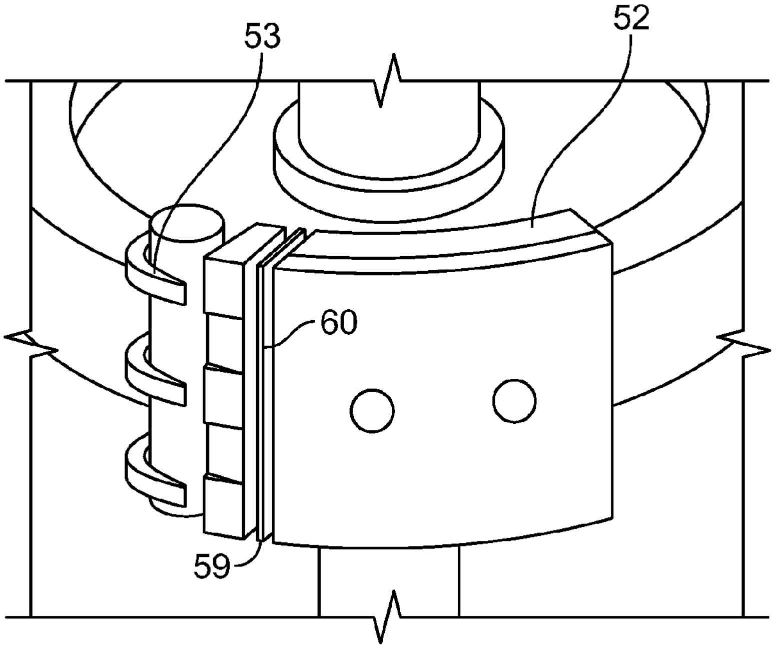
FIG. 11 is a partial perspective view of one of the pads and its label retaining members with an optional wiper for use at the label application station of FIG. 1.

The label retaining members 53 release and forward movement of pad 54 are timed with position the pad 54 of second transfer member 50 at label application station 24. Optionally, additional mechanism provided by a wiper 59 may be provided to increase the contact of label to container at the label application station 24. As shown in FIG. 11, wiper 59 is positioned between each pad 52 and label retaining member 53. Wiper 59 has an edge 60 which moves forward to abut against label 12 at label application station 24, and at other times is recessed between 52 and label retaining member 53. This wiper can assist in engagement of the tacky label with the periphery of the containers 20. A cam mechanism is provided which may be similar to that used to move the pad 52 forward and back in a radial direction to enable desired motion of wiper 59. In other words, a wheel coupled to wiper tracks a stationary cam surface as the wheel rotates with rotation of second transfer member 50. The cam surface has a rise at or near station 24 which moves the wiper coupled to the wheel forward, and a decline or ramp after station 24 to move the wiper back to return to resting position. Preferably, the wiper has a spring that bias the wiper inwards with the wheel, and at the moment the label is applied each wheel rides up the cam, pushing the wiper outwards. The cam mechanism for the wiper may be the same as that that used in conventional labeling machines which actuate a pad in/out for applying labels to the neck of a bottle or an area that is recessed from the outward face of the bottle.

Figure 12:
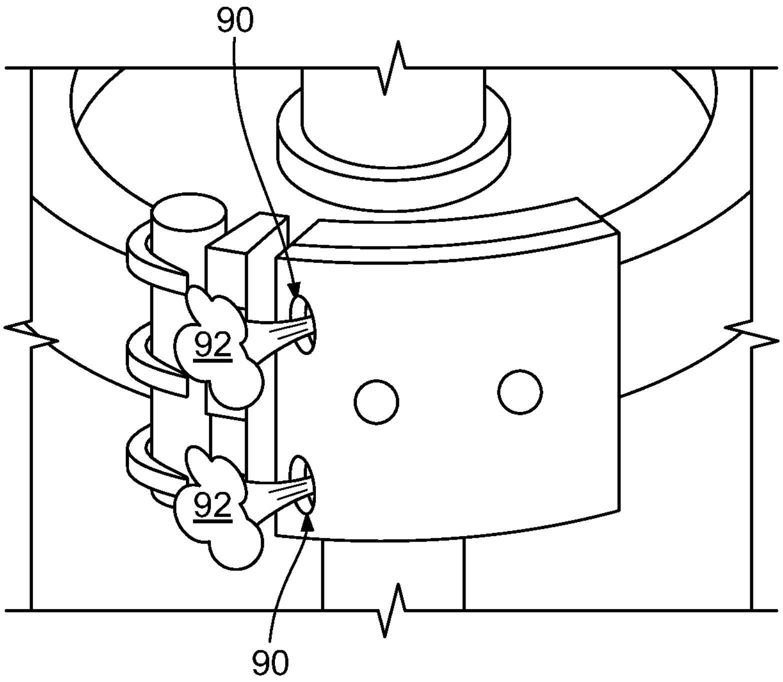
FIG. 12 is a partial perspective view of one of the pads for use at the label application station of FIG. 1.

While in the example described above in relation to FIG. 11, a wiper 59 was provided to increase the contact of label to container at the label application station 24, other mechanisms can be used to increase the contact of label to container at the label application station 24. For example, as shown in FIG. 12, the system can include an "air blow" function to increase the contact. The air blow would be timed to supply a momentary burst of air (e.g., via a pressurized air device configured to supply airflow 92 through holes 90) when the label is being applied to aid in the application of the label.

Thus, as noted earlier herein, the apparatus and method described herein are not required to handle a tacky and/or high viscosity adhesives throughout the majority of the process. This provides for a cleaner running operation. Furthermore, existing labeling machines can be readily retrofitted for use of labels having fluid activatable adhesive, where the transfer member 34 is provided by pallets 32 rather then conventional transfer pads or plates, and adhesive is activated only after the label is transferred from transfer member 34 to transfer member 50 and before label application to containers. Thus, rollers or other means along transfer member 45 for applying adhesives are no longer needed prior to pickup of labels at transfer station 40.

In some examples, the systems described herein can be configured to accommodate labels of different sizes. Systems such as those described herein can provide various advantages over glue-apply techniques (e.g., systems in which a tacky glue is applied to the back of a label). Such glue apply-techniques are believed to require different parts (e.g., different pallets and pads) for different dimensions of labels.

For example, the pallets (e.g., pallet 32) can include an array of suctions cups (e.g., suction cups 32*g*) and a vacuum may be applied only to the subset of suction cups likely to be in contact with the label. More particularly, if the label is similar in size or larger than the pallet, a vacuum may be applied to each of the suction cups in the pallet. However, if the label is smaller than the size of the pallet, a vacuum may be applied only to a subset of the suction cups in the pallet (e.g., to less than all of the suction cups). In order to selectively turn on and off the vacuum to each of the suction cups in the pallet, separate valves are associated with each of the suction cups to allow selective application of a vacuum to a selected set of the suction cups.

In an additional example, the strength of the vacuum applied to each of the suction cups and to the label can be varied based on the size and weight of the labels to be applied by the labeling system 10. For example, the strength of the vacuum can be increased for labels having a larger mass and decreased for labels having a smaller mass. Selecting the strength of the applied vacuum based on the mass of the label is believed to be beneficial because heavier labels will be effectively maintained on the pallet using a vacuum strength that might harm a label having a smaller mass (e.g., by causing a depression in the label material).

In yet another example, the strength of the vacuum applied to the suction cups in the pallet can be configured to allow the pallet to be used with labels of different sizes without requiring adjustment of the vacuum applied based on the size of the label. For example, a vacuum can be applied that is strong enough to maintain contact of the label with the pallet even if some of the suction cups are not covered by the label. For example, the strength of the vacuum can be selected to account for the airflow into the suction cups not covered by the label and maintain a vacuum sufficient to hold the label.

In some additional examples, the location and activation of the sprayers 54*a* for application of the adhesive activation fluid 19 onto labels 21 can be adjusted to accommodate labels of different sizes. For example, a control system can actuate the nozzle's to apply fluid 19 to wet label 21 as it moves through station 54. Additionally, in systems that include multiple sprayers, the sprayers which are activated can be controlled such that only the sprayers aligned with the label will be activated. Further, the location of the sprayers 54*a* can be mechanically adjustable to adjust the alignment of the sprayers based on the size and location of the label.

Figure 13:
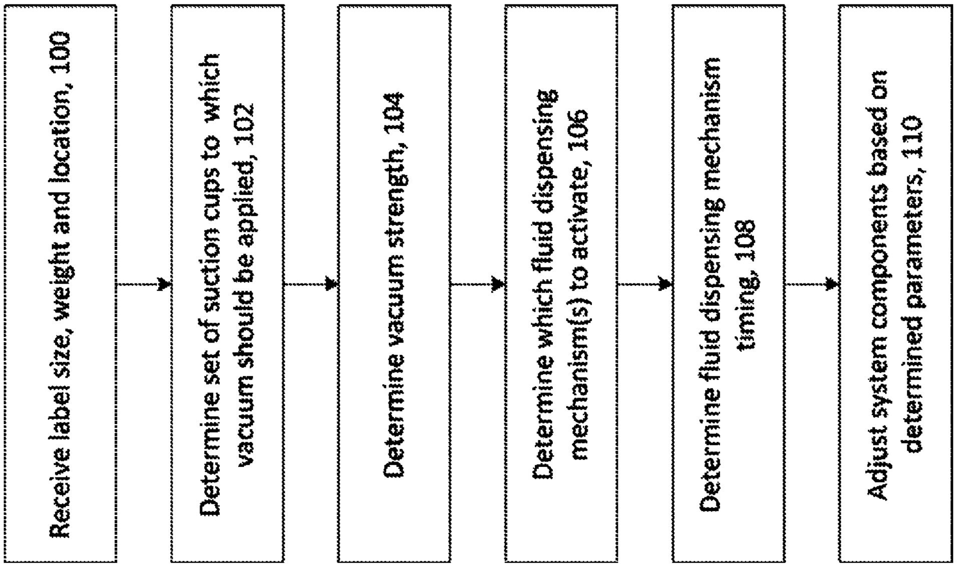
FIG. 13 is a flow chart of a process for modifying system parameters to accommodate differently sized labels.

In some examples, a software module can be used to configure the system to accommodate labels of different sizes. For example, as shown in FIG. 13, a computer-implemented configuration process can include receiving information about the label (100). For example, a user can input information about the size, location and weight of a label via a user interface. Based on the received information, the process can determine a set of suction cups to which the vacuum should be applied based on the size and location of the label (102). For example, as described above, the vacuum can be selectively applied to only the suction cups likely to be in contact with the label during use. The process can also include determining a strength of the vacuum to be applied (104). For example, the strength of the applied vacuum can be proportional to the weight of the label. The vacuum strength can be calculated according to a formula or according to a look-up table stored in a memory. The process can also include determining which fluid dispensing mechanisms (s) to activate (106) and the timing of the fluid dispensing mechanism activation (108). For example, the fluid dispensing mechanisms and their timings can be selected based on their position and based on the size and location of the label on the pallet. The system also adjusts system components based on determined parameters (110).

While in at least some of the examples above, each of the pallets 32 included a suction supply mechanism provided along each pallet 32 (e.g., vacuum generators 32*f* along the backside of each pallet 32 shown in FIG. 4D). However, in some embodiments, the vacuum generator can be located remotely from the pallet. For example, the vacuum generator can be located at a distance from the rotating platform or turret 22.

Figure 14:
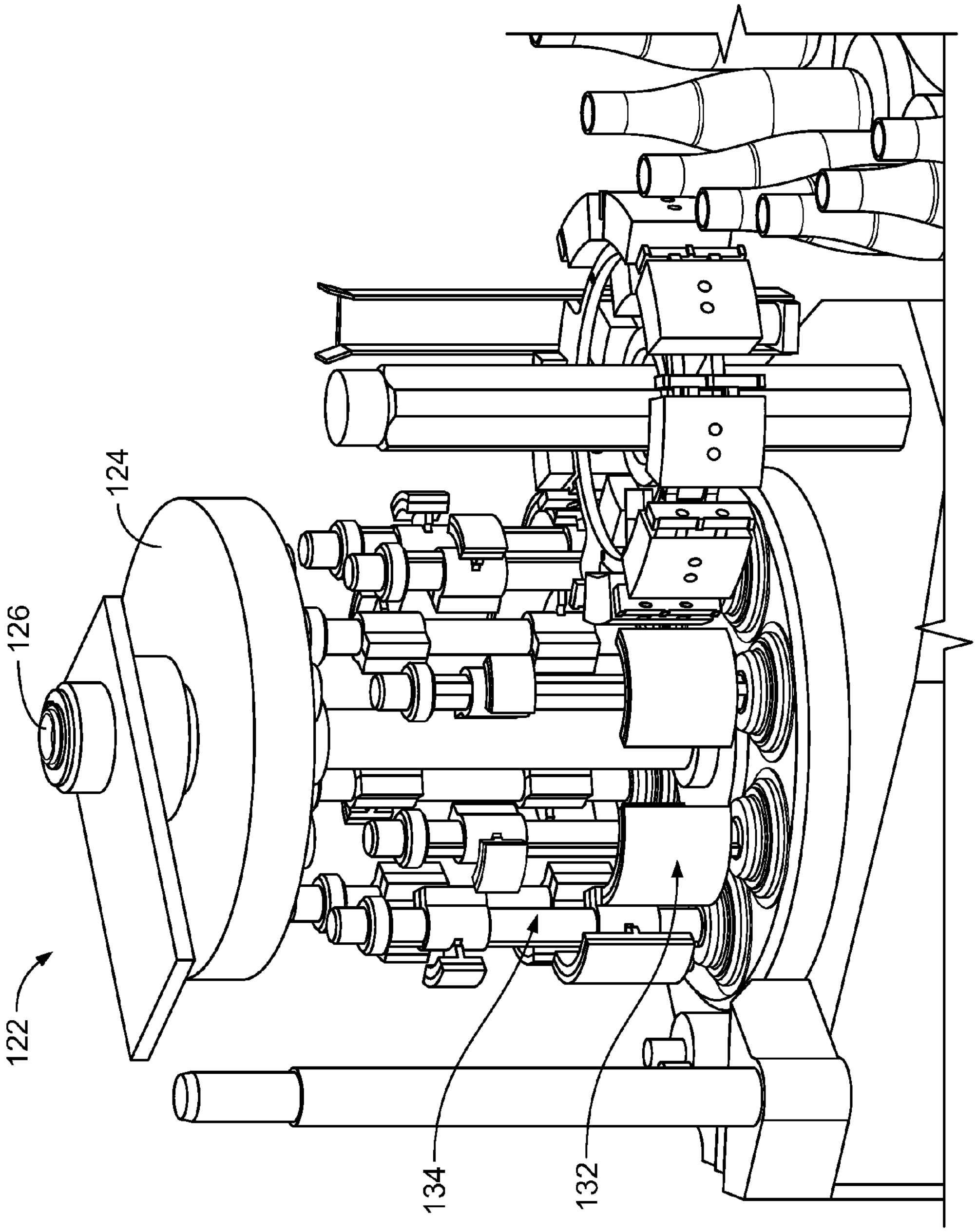
FIG. 14 is a schematic, plan view illustrating a labeling apparatus.

One exemplary system in which the vacuum generator is located remotely from the turret is shown in FIG. 14. In a rotating platform or turret 122 a large diameter rotary union 126 on the top of the turret 122 transfers vacuum between a flexible hose coming from a remote vacuum pump (not pictured) through the center axis of the turret 122. A hollow chamber 124 is connected to the vacuum pump such that, during use, the hollow chamber 124 is evacuated by the vacuum pump such that the hollow chamber exhibits a pressure below atmospheric pressure (e.g., at a vacuum of 10 in. of mercury to 30 in. of mercury). Each turret 122 would have a connection to the vacuum chamber. In one particular example, flexible conduits extend from the bottom of the chamber 124 to each pallet 132 (not shown). In another example, additional rotary unions would be used to transmit vacuum through the centers of each pallet shaft 134, and then a secondary conduit would be used to transport vacuum to the individual suction cups in the pallet 132.

While in at least some of the examples shown above the pallets (e.g., pallets 32 and 132) have a flat or substantially flat surface and in some situations the label can be in physical contact with at least a portion of the surface. In other examples, such as the examples shown in FIGS. 15A and 15B, an upper surface of a pallet 232 can be formed primarily of an arrangement of multiple suction cups 234. In such examples, the label is held by the suction cups 234 and does not contact a surface of the pallet itself (other than the upper surfaces of the suction cups).

As noted above, the pallet can have multiple suction cups arranged in a configuration in which the vacuum can be selectively applied to a selected subset of the suction cups when the label is smaller than the total size of the pallet. In order to selectively apply the vacuum to various ones of the suction cups, each suction cup 234 has an associated valve. The valves are opened and closed by turning the heads of the valves 238. Thus, each suction cup has a separate air conduit that is valved so that it can be individually controlled. Additionally, each column of suction cups 234 can be connected by a separate vertical air channel. In the example shown in FIGS. 15A and 15B in which there are three columns of suction cups, there are three main vertical channels (e.g., channels 240, 242, and 244), connected by tubing above the pallet (not shown). The tubing can be connected to entrances 241, 243, and 245 to each of the vertical channels 240, 242, and 244, respectively. A single pressurized air conduit comes in to the pallet from above. In a machine where vacuum was being transmitted instead of pressurized air, vacuum would be transported straight into the pallet.

Figure 15A:
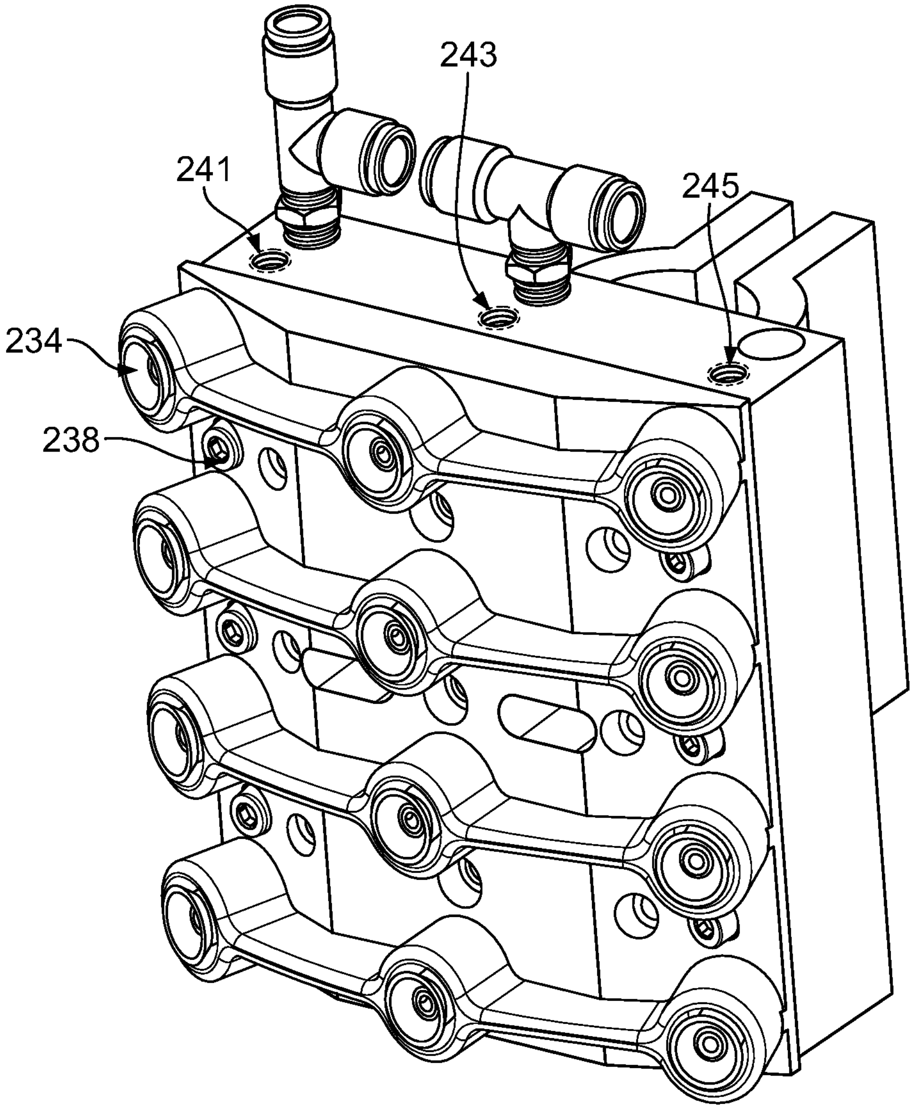
FIGS. 15A and 15B are diagrams of a pallet.
Figure 15B:
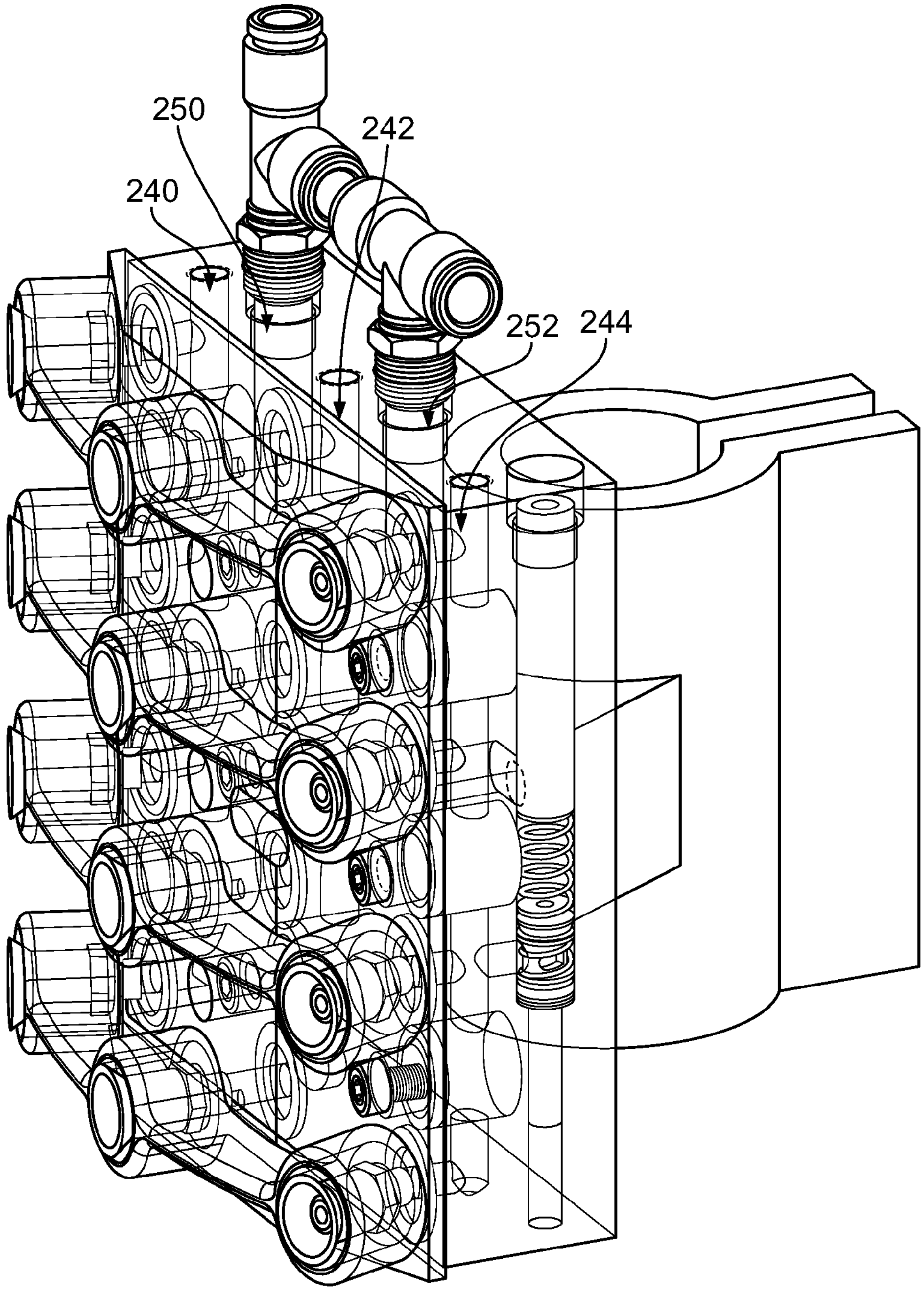

FIG. 15B shows a transparent view of the pallet of FIG. 15*a*. There are two vertical channels 250 and 252. The rear channel 252 take pressurized air through a venturi generator to create vacuum. The front channel 250 contains the vacuum conduit connected to each suction cup, and the rotary valves 238 that allow the operator to control each.

From the foregoing description, it will be apparent that there has been provided an improvement to an automated labeling machine for use with labels having fluid activatable adhesive. Variations and modifications in the herein described improvement, method, or system with machine 10 and liner-free labels 21, will undoubtedly suggest themselves to those skilled in the art. Accordingly, the foregoing description should be taken as illustrative and not in a limiting sense.

What is claimed is:

1. An apparatus for automatically applying to objects labels having a back surface with fluid activatable adhesive, the apparatus comprising:
- a dispensing magazine for retaining a plurality of individual labels in a stack;
- a guidance mechanism configured to provide a first path for moving a plurality of labels along the first path, the labels each having a front surface and a back surface with a fluid activatable adhesive, the guidance mechanism including:
  - a first transfer member comprising multiple pallets, each pallet being positionable to receive one of the labels from the dispensing magazine and move the one of the labels along a first segment of the path, the pallets each including:
    - multiple openings for communication of suction to enable the first transfer member to receive and releasably secure the one of the labels onto the pallet;
    - multiple suction cups each including a central hole through which suction is communicated via a corresponding one of the openings to direct suction onto select areas of the one of the labels;
    - multiple valves, each of the valves being associated with one or more of the multiple openings, to selectively control communication of suction to a selected subset of the multiple openings based on a size of the one of the labels;
  - a second transfer member positionable with respect to the first transfer member to receive the one of the labels from the first transfer member and carry the one of the labels along a second segment of the first path, in which a front surface of the one of the labels faces the second transfer member;
- a device configured to modulate a location of the dispensing magazine to transfer the one of the labels to the first transfer member;
- a suction supply mechanism coupled to the first transfer member and configured to provide suction to the multiple openings, the suction supply mechanism controllable to vary a strength of the suction applied to the multiple openings based on the size and a weight of the one of the labels;
- an adhesive activation station along the first path configured to apply to the back surface of the labels a fluid to activate the fluid activatable adhesive along the back surface of the labels, the adhesive activation station including one or more spraying mechanisms for applying the fluid onto each of the labels as the labels move through the adhesive activation station along the first path; and
- a label application station at an end of the first path configured to apply the labels with the activated adhesive from the first path onto an exterior surface of a corresponding object along a second path.

2. The apparatus of claim 1 wherein the adhesive activation station is configured to adjust a flow rate of the spraying mechanisms based on label speed.

3. The apparatus of claim 1 wherein the adhesive activation station is configured to adjust timing of spraying of fluid from the one or more spraying mechanisms based on a label speed.

4. The apparatus of claim 1 wherein the second transfer member comprises multiple pallets, the pallets each including:

multiple openings for communication of suction to enable the second transfer member to receive and releasably secure the one of the labels onto the pallet; and multiple suction cups each including a central hole through which suction is communicated via a corresponding one of the openings to direct suction onto select areas of the one of the labels;

multiple valves, each of the valves being associated with one or more of the multiple openings, to selectively control communication of suction to a selected subset of the multiple openings based on the size of the one of the labels.

5. The apparatus of claim 1 wherein the labels are each received along the first path from the stack of labels.

6. The apparatus of claim 1 wherein the multiple suction cups are raised from a surface of the pallet such that during use the one of the labels is supported by a surface of the suction cups and is spaced apart from the surface of the pallet.

7. The apparatus of claim 1 wherein the first path has a first segment and a second segment, the first transfer member is configured to receive the one of the labels from the stack of the labels and move the one of the labels along the first segment of the first path in which the back surface of the one of the labels faces the first transfer member; the apparatus further comprising:

the second transfer member positionable with respect to the first transfer member to receive the one of the labels from the first transfer member and carry the one of the labels along the second segment of the first path, in which the front surface of the one of the labels faces the second transfer member, and the adhesive activation station is disposed along the second segment of the first path prior to the label application station.

8. The apparatus of claim 1, wherein the first transfer member is configured to accommodate labels of various sizes.

9. The apparatus of claim 1 wherein the second transfer member is configured to rotate the one of the labels along the first path through the adhesive activation station to apply a fluid for activating the fluid activatable adhesive on the back surface of the one of the labels.

10. The apparatus of claim 9 wherein the second transfer member has one or more openings for communication of suction to enable the second transfer member to receive and releasably secure the one of the labels onto the second transfer member.

11. The apparatus of claim 9 wherein the second transfer member includes one or more pads for receiving labels, and wherein one of the pads is rotated to the label application station and positioned at the label application station to engage the one of the labels on the one of the pads against the exterior surface of one of the objects to apply the one of the labels to the one of the objects with release from a retaining member associated with the one of the pads.

12. The apparatus of claim 11 wherein the one of the pads is of deformable material, and the one of the pads when positioned at the label application station deforms to conform with curvature of the exterior surface of one of the objects when applying the one of the labels of the one of the objects.

13. The apparatus of claim 11 wherein adjacent the one of the pads is a wiper member with a forward edge which at the label application station is directed to contact the one of the labels.

14. The apparatus of claim 1 further comprising an object handling device for moving the objects received at an inlet along the second path, whereupon the object handling device rotates the objects through the label application station, and directs successive ones of the objects each with different ones of the labels applied thereon to an outlet.

15. The apparatus of claim 1 wherein the label application station at the end of the first path comprises a wipe-on member which automatically positions each of the labels with the activated adhesive from the first path onto an exterior surface of a different one of the objects travelling along the second path.

16. The apparatus of claim 1 further comprising:

a detection device configured to detect a presence of a container at a specified location and modulate the location of the dispensing magazine to transfer the one of the labels to the first transfer member upon detection of the presence of the container.

* * * * *